(No Model.)

T. N. SUBERS.
ANTI FRICTION BEARING.

No. 388,228. Patented Aug. 21, 1888.

Witnesses:
Aly. Barkoff.
Jno. E. Parker.

Inventor:
Thomas N. Subers.
by his Attorneys.
Howson & Howson.

United States Patent Office.

THOMAS N. SUBERS, OF PHILADELPHIA, PENNSYLVANIA, ASSIGNOR, BY DIRECT AND MESNE ASSIGNMENTS, TO JOHN F. VOSS, OF SAME PLACE, AND JOHN W. BARRY, OF EAGLEVILLE, PENNSYLVANIA.

ANTI-FRICTION BEARING.

SPECIFICATION forming part of Letters Patent No. 388,228, dated August 21, 1888.

Application filed January 12, 1888. Serial No. 260,501. (No model.)

*To all whom it may concern:*

Be it known that I, THOMAS N. SUBERS, a citizen of the United States, and a resident of Philadelphia, Pennsylvania, have invented certain Improvements in Anti-Friction Bearings, of which the following is a specification.

My invention relates to that class of anti-friction bearings in which a series of rollers are interposed between a shaft or journal and the box, the main object of my invention being to so construct an anti-friction bearing of this class that deflection of the shaft or journal in respect to the box or of the latter in respect to said shaft or journal will not cause the rollers to bind in the box.

Figure 1:
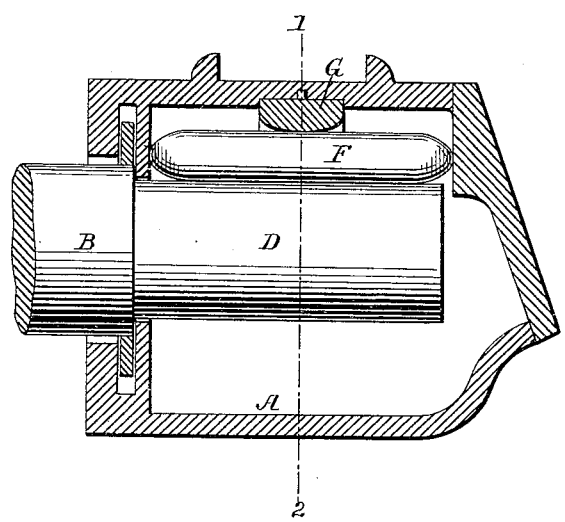
Figure 2:
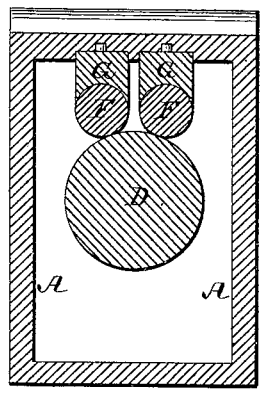

In the accompanying drawings, Figure 1 is a longitudinal section of a car-axle box having an anti-friction bearing constructed in accordance with my invention; and Fig. 2 is a transverse section on the line 1 2, Fig. 1.

A represents the casing of the box, which may be of any desired shape or size, and B is the axle, having a projecting journal, D, of somewhat smaller diameter than the axle, as usual. This journal has its bearing upon a pair of rollers, F F, which are free to turn on bearing-blocks G, adapted to suitable recesses in the top of the box A, each of these blocks fitting around the upper half of one of the rollers F, and being located about midway of the length of said roller, the block being rounded in cross section, as shown in Fig. 1.

The rollers F are retained in position longitudinally by reason of their bearing against the opposite ends of the box A; but owing to the fact that they are supported upon rounded bearing-blocks G of contracted width, said rollers are free to yield to accommodate themselves to any deflection of either the journal or box from a true horizontal line, so that no jamming of the rollers in the box is possible; hence said rollers provide an anti-friction bearing for the journal under all conditions of use.

The bearings G may, as will be evident, be beveled instead of rounded, and both bearings G may be formed in one block, if desired; but the use of independent rounded bearing-blocks is preferred.

I claim as my invention—

1. The combination of a shaft or journal and its box, rollers forming the bearings for said shaft or journal, and bearing-blocks on which said rollers are free to swing, all substantially as specified.

2. The combination of the shaft or journal and its box, the anti-friction rollers, bearing-blocks on which said rollers are free to swing, and opposite bearings between which the rollers are confined longitudinally, all substantially as specified.

3. The combination of the shaft or journal and its box, the anti-friction rollers, and rounded bearing-blocks located midway of said rollers and adapted to recesses in the top of the box, all substantially as specified.

In testimony whereof I have signed my name to this specification in the presence of two subscribing witnesses.

THOMAS N. SUBERS.

Witnesses:
   WILLIAM D. CONNER,
   HARRY SMITH.